US009645282B2

(12) United States Patent
Hale et al.

(10) Patent No.: US 9,645,282 B2
(45) Date of Patent: May 9, 2017

(54) ADAPTIVE WEATHER INTERROGATION SYSTEM

(71) Applicant: The Boeing Company, Chicago, IL (US)

(72) Inventors: Ryan D. Hale, Kent, WA (US); Louis J. Bailey, Covington, WA (US); Gregory T. Saccone, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 763 days.

(21) Appl. No.: 13/904,132

(22) Filed: May 29, 2013

(65) Prior Publication Data

US 2014/0358441 A1    Dec. 4, 2014

(51) Int. Cl.
*G01W 1/02*    (2006.01)
*G01W 1/10*    (2006.01)
*G01W 1/00*    (2006.01)

(52) U.S. Cl.
CPC ............. *G01W 1/02* (2013.01); *G01W 1/10* (2013.01); *G01W 2001/006* (2013.01); *G01W 2203/00* (2013.01)

(58) Field of Classification Search
CPC ... G01W 1/02; G01W 1/10; G01W 2001/006; G01W 2203/00
USPC .......................................................... 702/2
See application file for complete search history.

(56) References Cited

U.S. PATENT DOCUMENTS

| 6,462,665 | B1* | 10/2002 | Tarlton | G01W 1/02 340/539.1 |
|---|---|---|---|---|
| 8,165,790 | B2 | 4/2012 | Bailey | |
| 8,332,084 | B1 | 12/2012 | Bailey et al. | |
| 2002/0092965 | A1* | 7/2002 | Addink | G01W 1/10 250/203.4 |

(Continued)

FOREIGN PATENT DOCUMENTS

| EP | 2290636 A1 | 3/2011 |
|---|---|---|
| EP | 2541528 A2 | 1/2013 |

(Continued)

OTHER PUBLICATIONS

ISA Written Opinion, International Application No. PCT/US2014/026574 (foreign counterpart to the instant application), dated Dec. 10, 2015.

(Continued)

*Primary Examiner* — Gregory J Toatley, Jr.
*Assistant Examiner* — Yoshihisa Ishizuka
(74) *Attorney, Agent, or Firm* — Ostrager Chong Flaherty & Broitman P.C.

(57) ABSTRACT

An adaptive weather interrogation system capable of determining whether currently available weather for a particular trajectory or portion thereof, a particular volume of space or geospatial point meets subscriber operations and requirements. More specifically, the system provides the capability to determine the "best" weather information by evaluating the weather data and associated weather quality, accuracy or confidence attribute values against subscriber operations and requirements. If the weather data, quality, accuracy, and confidence do not meet the subscriber's requirements, the system is capable of interrogating weather data sources for additional or updated weather data to meet the subscriber's needs.

20 Claims, 2 Drawing Sheets

(56) References Cited

U.S. PATENT DOCUMENTS

| | | | | |
|---|---|---|---|---|
| 2006/0184326 A1* | 8/2006 | McNally | ............... | G01W 1/10 |
| | | | | 702/3 |
| 2011/0050458 A1* | 3/2011 | Bailey | ............... | G08G 5/0013 |
| | | | | 340/901 |
| 2011/0144875 A1* | 6/2011 | Rado | ............... | B60T 8/1703 |
| | | | | 701/70 |

FOREIGN PATENT DOCUMENTS

| | | | |
|---|---|---|---|
| EP | 2541530 | A2 | 1/2013 |
| EP | 2574965 | A2 | 4/2013 |
| EP | 2575120 | A2 | 4/2013 |
| EP | 2575121 | A2 | 4/2013 |

OTHER PUBLICATIONS

International Search Report, International Application No. PCT/US2014/026574 (foreign counterpart to the instant application), dated Apr. 6, 2015.

\* cited by examiner

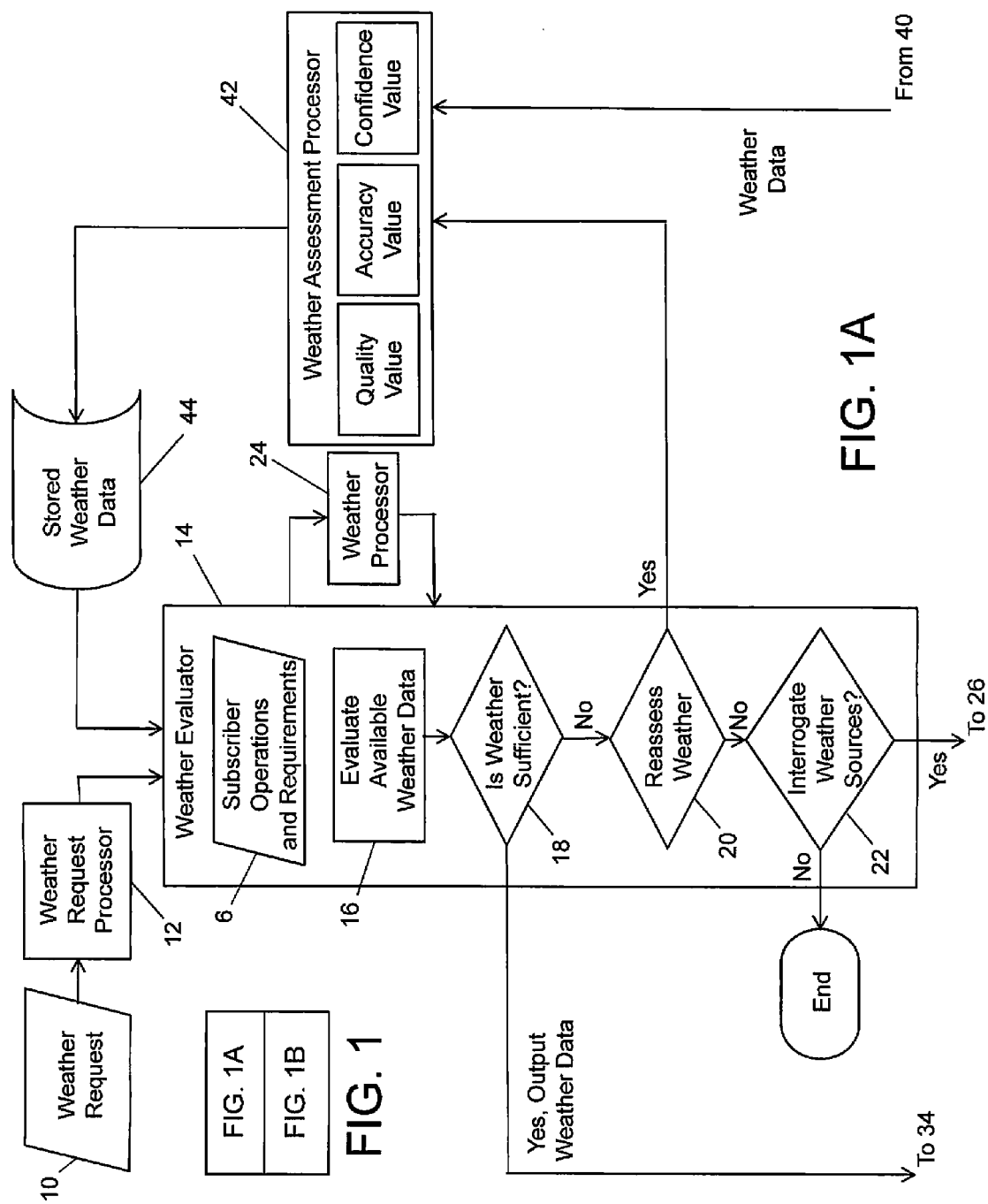

ADAPTIVE WEATHER INTERROGATION SYSTEM

BACKGROUND

This disclosure relates to methods and apparatus to determine the required weather data and weather source sufficient to meet the operational or business constraints for a user or airspace environment.

Weather information (including wind, temperature, and turbulence) is one of the key factors of advanced air traffic management concepts. Typically, weather information is not uniformly applied to aircraft in flight. In many cases, no weather information is available, there is a multitude of viable weather data from multiple sources available, or the weather data, when available, is too old to be relevant or lacks the granularity needed to allow the flight management system to provide accurate predictions.

Weather assimilation and modeling systems such as NOAA's Rapid Refresh provide weather forecast data. This system represents and serves as a one potential source of forecasted weather data, but does not isolate the weather applicable to a flight trajectory. A system that does a projection of weather over a flight trajectory would be NOAA's Aviation Digital Data Service application, but it does not function outside the United States, and does not evaluate weather from multiple sources or evaluate weather against the needs or requirements of a user or an airspace.

Current solutions for obtaining weather generally use forecast weather applicable to a large region and the forecast weather information is updated at relatively long intervals when compared against events in a flight trajectory. For example, a typical aircraft descending from an altitude of 33,000 feet takes 20-25 minutes to reach the airport, whereas the forecast weather information is updated in 30-minute, 1-hour or 3-hour intervals from data recorded in the previous time interval. Therefore, weather for one segment of the flight might not be applicable to other segments. Some attempts have been made to achieve higher resolution and quicker updates of forecast weather, but those are generally applicable to a very small area, and introduce inaccuracies due to processing limitations. This also assumes an instantaneous delivery of the weather data to the recipient. For instance, for a forecast weather model produced every 30 minutes, at the time the processing is complete, the weather forecast is already 15-30 minutes old. Next, the time to transmit the data, receive the data by recipient, and finally process the received data must be considered for accuracy. This process can take an additional 30 minutes for a total of 1 hour from the time of the forecast, which directly impacts the accuracy when compared to actual weather readings.

Data fusion or data assimilation of the weather information may also be performed, but is not in a user-preferred manner that allows different smoothing and filtering techniques to be applied, or that takes a normalized timeline into account. Moreover, the weather within the most applicable volume around the trajectory is often not analyzed in the applicable time, which may lead to inaccurate results.

U.S. Pat. No. 8,332,084 (the disclosure of which is incorporated by reference herein in its entirety) discloses systems and methods for integrating and interpolating disparate weather information from multiple weather data sources in order to determine an effect of the disparate weather information on an aircraft's trajectory, such as on a planned trajectory, a current trajectory, or an intent trajectory. The system disclosed in U.S. Pat. No. 8,332,084 may further predict an updated trajectory of an aircraft or may provide an optimized alternate trajectory. By using highly accurate four-dimensional trajectory predictions, comprising the (X,Y,Z) coordinate location of the aircraft over the aircraft's trajectory versus time, combined with multiple weather data sources (e.g., Rapid Refresh, Automatic Dependent Surveillance-Contract, Mode S, or other types of weather data sources), projecting and associating the weather data sources in time, and applying smoothing techniques, a high level of accuracy in the weather data over the four-dimensional trajectory may be obtained. This data may be manipulated by using user-input configuration preferences, by using weighted analysis, and by applying error-corrected aircraft trajectory information, to determine a more accurate, updated four-dimensional trajectory of the aircraft. The error-corrected aircraft trajectory information may be continuously updated and adjusted as the flight of the aircraft progresses. This may allow for highly accurate four-dimensional trajectory projections.

In order to determine the effects of weather on an aircraft's trajectory, a user (e.g., an airline operator, air traffic controller, flight plan service) typically receives disparate weather information by subscribing to multiple weather data sources. Given a multitude of forecasted and in-situ weather information, it would be advantageous to have the capability to determine the "best" weather information that meets operational, performance or cost requirements for a particular subscriber or subscribers given a set of forecast and in-situ weather data. As used herein, the term "subscriber" means any internal or external system, service or user making a request to or receiving from the system. The system publishes the weather information as directed by the user or system configuration. In this case, the "best" weather information is defined as the weather data from a multitude of weather data sources that is as close as possible to actual weather. Currently all weather data sources build their weather data package using forecasted weather data. The "best" weather information defaults to data provided from the weather source where no actual determination is made of the best weather for that given operational, performance or cost requirement. Weather solutions are then built based on this weather data package, which may not meet subscriber operations and requirements. This problem is magnified in a situation where in-situ weather data is available. In-situ weather data is generally assumed to be "best", which may not be true if it does not meet the subscriber operations and requirements.

There is a need for systems and methods for processing forecasted and in-situ weather data from multiple sources at varying times and with different resolutions for the purpose of determining which data and data sources are sufficient for subscriber needs.

SUMMARY

The subject matter disclosed herein includes systems and methods for processing forecasted and in-situ weather data from multiple sources at varying times and with different resolutions for the purpose of determining which data is sufficient for subscriber needs. The systems disclosed herein solve the problem of determining the "best" weather information within the confines of subscriber operations, requirements, weather-characterizing attributes, and cost given the available weather data and weather data sources (aircraft, vehicles or ground systems). An evaluation is performed to first determine the "best" available weather information and then determine whether that weather information meets the subscriber operations and requirements or not. The "best"

weather information can be determined by an assessment of the quality, accuracy or confidence attribute values of the available weather data. If the weather information is not sufficient, the system provides the capability to determine when and how long to wait for additional weather information or when to interrogate in-situ and/or forecasted weather suppliers for additional or updated weather data. Interrogation is defined as a synchronous or asynchronous signal or request for information with a response occurring immediately, occurring at some time(s) in the future, or never occurring due, for example, to unavailable weather data or weather sources.

One aspect of the subject matter disclosed herein is a method, performed by a computer system, for processing weather data, comprising the following operations: (a) storing weather data from a multiplicity of weather data sources; (b) translating a weather data request into elements of time and a geospatial point or volume in accordance with subscriber preferences or system configuration; (c) selecting weather data from the stored weather data, the selected weather data being associated with the geospatial point or volume of space and time; and (d) determining whether the selected weather data meets the requirements of the subscriber or not. The selected weather data may comprise weather quality, accuracy or confidence attribute values. The determining operation comprises determining whether the weather quality, accuracy or confidence attribute values of the selected weather data falls within a subscriber defined range of acceptable values or not. In the event the selected weather does not contain the weather quality, accuracy or confidence attribute values, the computer system is programmed to execute processes for determining these values.

In accordance with further aspects of the foregoing method, after a determination that the selected weather data meets the subscribers requirements, the following operations can be performed: formulating a weather message containing the selected weather data; and sending the weather message to or making the weather message available to the subscriber. In contrast, after a determination that the selected weather data (raw or processed) does not meet the subscriber's requirements, the following operations can be performed: determining whether the selected weather data should be reassessed or not; and/or determining whether additional or updated weather data is needed in order meet the subscriber's requirements or not. After a determination that additional or updated weather data is needed, the following operations are performed: identifying which weather data source should be interrogated in order to obtain additional or updated weather data; determining when that weather data source should be interrogated; formulating an interrogation message containing a request for additional or updated weather data; and sending the interrogation message to the weather data source. Following transmission of the interrogation message, the following operations are performed: receiving additional or updated weather data from the interrogated weather data source; assess or determine the required weather quality, accuracy or confidence attribute values of the additional or updated weather data; storing the additional or updated weather data; and repeating operations (b) and (c) (set forth in the preceding paragraph) taking into account the weather quality, accuracy or confidence attribute values of the additional or updated weather data.

Another aspect of the subject matter disclosed herein is a system for processing weather data, comprising a computer system programmed to perform the operations of the method described above.

A further aspect is a system for processing weather data, comprising a computer system programmed to perform the following operations: (a) storing weather data from a multiplicity of weather data sources; (b) retrieving from data storage weather data associated with a geospatial point or a volume of space and time, wherein the retrieved weather data comprises weather quality, accuracy or confidence attribute values; (c) assess or determine the weather quality, accuracy or confidence attribute values of the retrieved weather data that does not fall within a subscriber-defined range of acceptable values; (d) determining that additional or updated weather data should be requested from a weather data source; (e) formulating an interrogation message containing a request for additional or updated weather data; and (f) sending the interrogation message to the weather data source. The computer system may be further programmed to perform the following additional operations: (g) receiving additional or updated weather data from the interrogated weather data source; (h) assess or determine the weather quality, accuracy or confidence attribute values of the retrieved weather data that does not fall within the subscriber-defined range of acceptable values; (i) formulating a weather message containing the additional or updated weather data; and (j) sending the weather message to a subscriber.

Other aspects are disclosed in detail and claimed below.

BRIEF DESCRIPTION OF THE DRAWINGS

FIG. 1 is a diagram showing the relationship of FIGS. 1A and 1B. FIGS. 1A and 1B are diagrams showing respective portions of a system for processing forecasted and in-situ weather from multiple weather data sources in accordance with one embodiment of the teachings herein.

DETAILED DESCRIPTION

Figure 1B:
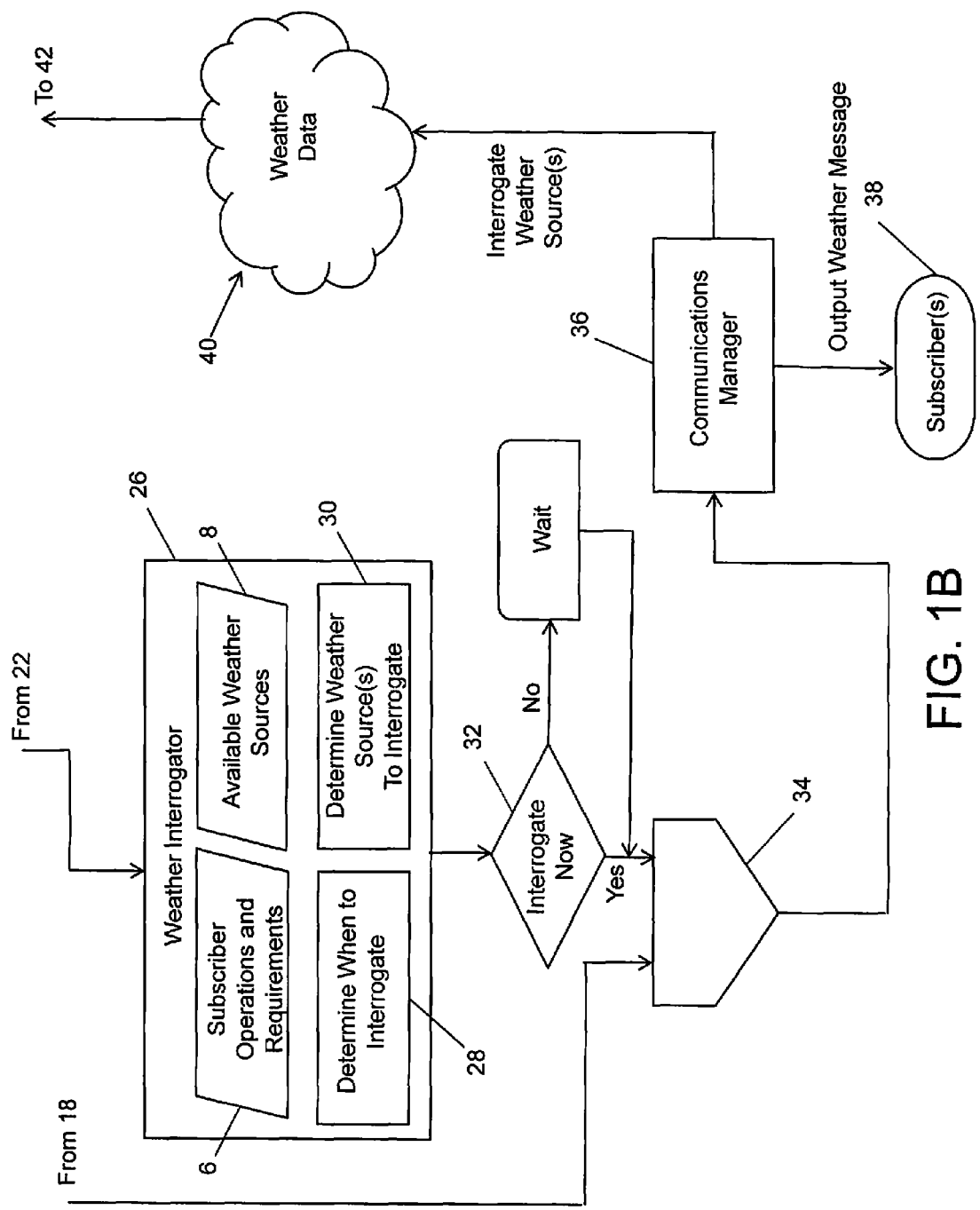

The following description refers to various processes that are executed by one or more processors. These processes take the form of software running on one or more computers. It should be appreciated that each disclosed process can be executed by a respective processor or all processes can be executed by one processor or any variation therebetween.

One embodiment of a system for processing forecasted and in-situ weather data from multiple weather data sources to determine which data is sufficient for subscriber needs will now be described. The weather data sources may be selected from the following categories: one or more forecast weather model grid data sources comprising weather data based on grid location; an Automatic Dependent Surveillance—Contract message comprising weather data transmitted from an aircraft; an Automatic Dependent Surveillance—Broadcast message comprising weather data transmitted from an aircraft; weather data derived from or contained in a Mode S message transmitted from an aircraft; a radar weather data source comprising weather data derived from discrete flight data; a data source comprising at least one wind report; compiled historical data comprising weather data for at least one historical time; or other types of weather data sources. The foregoing weather data sources are merely examples of the types of weather data sources that are available, but the system disclosed hereinafter is not limited to using these particular weather data sources. For example, the system disclosed hereinafter can utilize a customized weather data source. The weather data may comprise wind speed, wind direction, wind location, wind shear, temperature, turbulence, barometric pressure, atmospheric pressure, humidity, quality attribute, accuracy attribute, confidence attribute or other types of weather data.

FIGS. 1A and 1B show one embodiment of a system for processing forecasted and in-situ weather data from multiple sources at varying times and with different resolutions for the purpose of determining which data is sufficient for subscriber needs. Referring to FIG. 1A, a weather request 10 is received as input and processed by a weather request processor 12. The weather request 10 may include such parameters as time or a geospatial point or volume (e.g., point list, boundaries, corridors, etc.) or it may be flight data (e.g., altitude, speed, position, waypoints, etc.) in the form of a flight plan, trajectory, or other format. The weather request processor 12 may be used if additional processing of the weather request 10 is required prior to making the request available to the weather evaluator 14. One example of this is a weather request in the form of a flight plan. In this case, a flight plan processor (incorporated within the weather request processor 12) may be used to translate a flight plan into specific geospatial locations and times for processing by the weather evaluator 14.

The weather evaluator 14, described in detail below, receives the weather request 10 and performs an evaluation to see if the currently available weather data in stored weather data 44 is sufficient to meet the subscriber requirements and operations 6. If available weather data is insufficient or missing, the weather evaluator 14 determines that an interrogation should take place for the additional weather data.

The weather interrogator 26 (shown in FIG. 1B and described in detail below) determines which weather data source(s) to interrogate and when to interrogate them based on the capabilities and availability of the weather data sources and weather data, the output from the weather evaluator 14, and the subscriber operations and requirements 6. The weather interrogator 26 may be required or may be configured to wait to interrogate a weather data source or it may perform the interrogation immediately. The interrogation request is then passed to the communications manager 36 (shown in FIG. 1B) to interrogate the weather data source or sources.

The communications manager 36 is used to communicate with external subscribers 38 and weather data sources (represented by the cloud of weather data 40 in FIG. 1B). It accepts weather data intended for a subscriber or an interrogation request intended for a weather data source as inputs and directs them to the appropriate recipient in the appropriate format.

Once interrogated, the weather data source(s) may provide weather data 40. This weather data is made available and ingested by the weather assessment processor 42, described in detail below, to assess quality, accuracy, and confidence of the weather data. The assessed values and weather data are then stored in weather data 44, where they are available to the weather evaluator 14.

Weather Evaluator

The weather evaluator 14 will evaluate available weather data 16 (forecast and in-situ) and its weather quality, accuracy or confidence attribute values (determined by the weather assessment processor 42 or a weather data source 40) against the subscriber operations and requirements 6 for any given time and location.

The subscriber operations and requirements 6 may, for example, specify thresholds for cost, weather quality, accuracy or confidence attribute values, timing, uplink success rate, flight deck workload, and a set of acceptable weather data sources. The subscriber may also specify none of these as an indication that it expects the best of all available weather data. Along with the available weather and its weather quality, accuracy or confidence attribute values, the weather evaluator 14 uses the subscriber operations and requirements 6 to evaluate available weather data 16 to determine whether the selected weather data is sufficient or not (operation 18 in FIG. 1A).

If the weather evaluator 14 determines (in operation 18) that the selected weather data meets subscriber operations and requirements 6, the weather evaluator 14 will output the weather data to the communications manager 36 via an output interface 34. The communications manager 36 places the selected weather data in a subscriber-defined format and then transmits the weather data to the subscriber 38 (see FIG. 1B).

If the weather evaluator 14 determines (in operation 18) that the stored weather data 44 does not meet subscriber operations or requirements 6, the weather evaluator 14 can determine (operation 20 shown in FIG. 1A) whether the weather quality, accuracy or confidence attribute values need to be reassessed based on other available weather data or subscriber operations and requirements or not. For example, forecasted data may have a confidence value indicating high confidence; however, if in-situ data that is deemed to be more accurate contradicts the forecasted data, the weather evaluator 14 may determine that the confidence value of the forecasted data needs to be reassessed by the weather assessment processor 42, in which case the weather evaluator 14 sends a reassessment request to the weather assessment processor 42. The reassessment request will include information identifying the stored weather data which needs to be reassessed.

If the weather evaluator 14 determines (in operation 20) that the weather quality, accuracy or confidence attribute values do not need to be reassessed, the weather evaluator 14 can determine whether there is a need or benefit to interrogate available weather data sources for additional data or not (operation 22 shown in FIG. 1A). If not, then the process is ended. If the weather evaluator 14 determines (in operation 22) that one or more weather data sources should be interrogated, the weather evaluator 14 sends an interrogation request to the weather interrogator 26 (shown in FIG. 1B). The interrogation request will include information identifying what additional weather information is being sought.

To determine which weather data to select from the stored weather data 44, the weather evaluator may communicate with a weather processor 24 of the type disclosed in U.S. Pat. No. 8,332,084 for the purpose of obtaining trajectory information corresponding to the weather data requested in the weather request 10. The weather processor 24 may process weather data from a multiplicity of weather data sources. The weather processor 24 may comprise a weather data module, a configuration data module, a weather selection module, and a trajectory predictor. The weather data module can be utilized to extrapolate, fuse, and filter weather data, based on location and time, received from the plurality of weather data sources. The configuration data module stores inputted subscriber-defined parameters. The weather selection module can be utilized to perform calculations on the extrapolated, fused, and filtered weather data based on weighted criteria. The trajectory predictor of weather processor 24 is capable of providing the trajectory of the aircraft to the weather evaluator 14 and predicting an updated trajectory of the aircraft based on the calculations performed by the weather selection module of the weather processor. In such manner, the weather processor 24 may determine four-dimensional weather data over the trajectory of the aircraft, may determine the forces acting on the aircraft over the trajectory based on the four-dimensional weather data, and may predict an updated four-dimensional trajectory of the aircraft based on those forces.

Based on the trajectory information received from the weather request processor 12, the weather evaluator 14 can process stored weather data 44 using the weather processor 24 and evaluate available weather data 16 against subscriber operations and requirements 6 to determine if the weather data is sufficient 18. As an example, the weather evaluator 14 may have access to both forecasted and in-situ weather information along a flight plan or trajectory. In this example, the weather evaluator 14 has determined that there is both forecasted data and in-situ data available and both are sufficient to represent the weather at a particular point that the aircraft will be passing in 35 minutes. For the purpose of this example, it is assumed that updated forecasted data is retrieved every 60 minutes (hereinafter "forecasted data issuance time") and represents 60 minutes of forecasted data. In this example, the forecasted data is 55 minutes old (an updated forecast is coming in 5 minutes). The in-situ data is 3 minutes old (will be 38 minutes old at the waypoint). First, the weather evaluator 14 determines whether to wait for the next forecasted data or not. Then the weather evaluator 14 determines whether either of the in-situ data or the forecasted data should be used now or not. One method to determine the solution is to base the choice on the forecasted data issuance time. For example, if the in-situ data will be no older than ½ of the forecasted data issuance time, the weather evaluator 14 will use the in-situ data. Otherwise, if the in-situ data will be older than ½ of the forecasted data issuance time, the weather evaluator 14 will use the forecasted data. In this example, the in-situ data will be 38 minutes old and ½ of the forecasted data issuance time (60 minutes) is 30 minutes. This would indicate the weather evaluator 14 will use the forecasted data. Additionally, there may be a determination that if new forecasted data is coming within some threshold (e.g., 10 minutes), the weather evaluator 14 will wait for the new forecasted data. In this example, using a 10-minute threshold, the weather evaluator 14 would wait for the new forecasted data coming in 5 minutes and then select the data corresponding to the weather at the waypoint of interest from the latest forecasted data.

As another example, if the available individual in-situ or forecasted weather data does not meet a particular requirement of the current operation as determined by the weather evaluator 14, it may be necessary to assimilate the data from multiple sources to meet the requirement. For the purpose of this example, assume that the accuracy and confidence indices (values) respectively decrease as accuracy and confidence increases; and further assume that the requirement states that the weather data must have both an accuracy value less than or equal to a specified accuracy value threshold and a confidence index (value) less than or equal to a specified confidence index threshold. In this example, in-situ data is available at a particular geospatial point, but it will be 15 minutes old when the aircraft reaches that point. Assume the in-situ data meets the weather accuracy value requirement, but the confidence index does not meet the weather confidence index requirement because the in-situ data will be 15 minutes old when it is required. There is also forecasted data available, but the weather accuracy value is too low even though the confidence index requirement is met. Neither source by itself will provide weather data sufficient to meet the operations requirement of the specific weather attribute (i.e., quality, accuracy or confidence). However, an evaluation of the two weather data sources by the weather assessment processor 42 could potentially lead to determining an acceptable weather attribute based on similarities in the weather information from the two sources (i.e., do the two different sources provide the same weather picture?). If additional weather data sources are available, the additional weather accuracy values and confidence indices available from those additional weather data sources could be utilized to influence the solution to determine the best weather information that meets the specified weather attribute requirement(s).

In a further example, assume that the system must meet a specific performance requirement for the operation. In the absence of weather quality, accuracy or confidence attribute values, the system may derive a weather attribute (i.e., quality, accuracy or confidence) based on the given performance requirement. For example, the performance requirement could be delivery of an aircraft at a metering fix within 8 seconds of a specified (i.e., scheduled) time of arrival. (As used herein, the term "metering fix" refers to a convergence waypoint where aircraft need to maintain required separation.) To meet the performance requirement that the difference between the specified time of arrival and the actual time of arrival be less than 8 seconds, the weather evaluator 14 would determine that the weather quality, accuracy or confidence attribute values must be at the highest level (as determined by the weather assessment processor or provided by the weather data source). From this, the weather evaluator 14 could determine whether the selected weather data was sufficient for this particular operation or not.

Weather Interrogator

Referring to FIG. 1B, the weather interrogator 26 determines when an interrogation should be made (operation 28) and which weather data sources to interrogate (operation 30). The weather data sources to be interrogated are selected from a list of available in-situ and forecasted weather data sources stored in computer memory. The list of available in-situ and forecasted weather data sources may be updated as additional weather data sources become available. The decisions made in operations 28 and 30 are based on subscriber operations and requirements 8 (stored in the same computer memory). The weather interrogator 26 may be required or may be configured to wait to interrogate a weather data source or it may perform the interrogation immediately (operation 32). The interrogation request is then passed via the output interface 34 to the communications manager 36, which formats the interrogation message and transmits it to the intended weather data source.

The weather interrogator 26 can also interrogate a weather data source to instruct it to regenerate its weather forecast. In addition, the weather interrogator 26 can determine the appropriate and applicable conditions to interrogate in-situ and forecasted weather suppliers for additional weather data. The appropriate and applicable conditions may include current availability of weather, model generation latency, and future availability of weather from weather suppliers as well as potentially other sources that can be directly queried, such as real-time data from aircraft and other independent weather data sources (e.g., mobile devices, weather stations, radar stations, etc.). An additional capability includes scheduling requests to weather sources at a specified time in the future or delivering a request to a weather source indicating a specified time in the future when the weather source is expected to deliver the weather data. For example, the weather interrogator could wait for 5 minutes before requesting weather data from a weather source. In another example, the weather interrogator could send a message to a weather data source indicating it was expecting delivery of weather information at some time in the future.

For example, in one scenario, a particular operation may have a requirement that up-to-date forecasted or in-situ weather data must be associated with geospatial points within 20 nautical miles of the reference point and have a wind speed accuracy value of ±3 knots (defined by a specification) for any particular point. If there is no up-to-date in-situ or forecasted data corresponding to geospatial points within 20 nautical miles of the reference point and if evaluating the multiple sources available leads to a wind speed accuracy value worse than ±3 knots, additional in-situ weather data will be requested for a geospatial point at or near the reference point, from whatever source is able to provide the data (e.g., an aircraft near the location, historical data from an aircraft that recently passed the location, independent MET measuring equipment/facilities, etc.).

For the purpose of further illustration, another example is provided below:
(A) Assumptions for the Purpose of this Example:
  Defined Weather Quality Attribute Requirements:
    Weather Accuracy Values
      Wind Speed: ±3 knots
      Wind Direction: ±1 degree
      Temperature: ±1 degree Celsius
    Confidence Index (1 to 10, high confidence to low confidence): 3
(B) Available Weather Data for the Point of Interest (2 Hours Out):
  In-Situ Data:
  Meets weather accuracy value requirements;
  Received 3 minutes ago (will be 123 minutes old);
  Airmass appears stable, but in-situ data will be old: Confidence Index of 7.
  Forecasted Data:
  Meets weather accuracy value requirements;
  Received every 60 minutes and forecasted out for 3 hours;
  Received 5 minutes ago;
  Airmass appears unstable even though forecast is out only 2 hours: Confidence Index of 4.

In the foregoing example, the accuracy values of both available in-situ and available forecasted data meet the performance requirements of the operation; however, the respective confidence indices of 7 and 4 each do not meet the confidence index requirement of 3 or less. In this case, the weather evaluator 14 would determine that the currently available weather data is insufficient for this operation. The system will either have to wait for additional weather data or interrogate other in-situ or forecasted weather suppliers to provide a higher confidence index. For the purposes of this example, assume that the system waits for 55 minutes until the next forecasted data is available. When the next forecasted data is available, the system may determine that the airmass is, in fact, more stable, increasing the confidence index to 2. Since the weather data meets weather accuracy value requirements and the confidence index value is less than 3, weather data from the forecast meets the performance requirements and can be provided for the geospatial point of interest for this operation. In a different situation, the weather interrogator 26 may be required to interrogate additional weather data sources (e.g., aircraft) for in-situ data. However, since the geospatial point of interest is 2 hours out, the weather interrogator 26 may wait a specified amount of time before attempting to interrogate those in-situ weather data sources.

Weather Assessment Processor

Referring to FIG. 1A, the weather assessment processor 42 assesses the weather quality, accuracy or confidence attribute values. The accuracy values or quality values may be received within weather data from a weather data source or configured per weather data source specification within the weather assessment processor 42. If the weather quality, accuracy or confidence attribute values are not received or specified, the weather assessment processor 42 can determine them. A weather quality value may be defined for each parameter or indicate the overall quality of the weather. The quality value may be identified as an index, a prioritization value, an enumeration value, or some other supplier- or custom-defined value. The quality value may be derived from accuracy and confidence values, configured, or provided by the weather data source. Alternatively, the quality value may be calculated by comparing a measurement from a single weather data source to statistics from a multiplicity of weather data sources.

In addition, a weather accuracy value may be defined for each parameter within the weather data. For example, a weather data source may define a weather accuracy value for wind speed as ±3 knots. This would indicate that the wind speed parameter is expected to be within 3 knots of the actual wind speed. The accuracy value may be derived from, for example, the weather source, the weather quality values and/or confidence values.

The confidence index (value) indicates how well a model expects its forecast to come to fruition. Similar to weather accuracy values, confidence values will be provided by weather data sources within their weather data or within a specification. If provided within a specification, the weather assessment processor will be configured to identify the confidence value for that particular weather data source. A confidence value may be defined for an entire forecast model, a geographic portion of a forecast model, or individual geospatial point(s) within the forecast model. For example, one weather forecast model may provide forecasted weather for a particular region. If the stability of an airmass within that region is low, the weather data source may provide a variable confidence value over time. Forecasted weather only 10 minutes out form current time may have a high confidence value while forecasted weather 3 hours from current time may have a low confidence value.

In summary, the weather assessment processor 42, weather evaluator, and weather interrogator 26 provide a system that is capable of determining whether the currently available weather data for a particular trajectory or portion thereof or for individual geospatial point(s) along that trajectory meets subscriber operations and requirements. More specifically, the system provides the capability to determine the "best" weather information by evaluating currently available weather data and associated weather quality, accuracy or confidence attribute values against subscriber operations and requirements. If the currently available weather data and the quality, accuracy, and confidence values do not meet the subscriber-defined operations and requirements, the system is capable of interrogating weather data sources for additional or updated weather data to meet the subscriber's needs. The system provides the capability to interrogate weather data sources based on current and future weather availability, available weather data sources, and subscriber operations and requirements.

The above-described system could be used to provide advisories to dispatchers and to aircraft, and may be configured as an independent ground system or integrated with current systems, or may be deployed as an application on a mobile device.

While an adaptive weather interrogation system has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed.

As used in the claims, the term "computer system" should be construed broadly to encompass a system having at least one computer and/or at least one processor, and which may have multiple computers and/or processors that communicate with at least one other computer or processor in the group (i.e., the multiplicity) by means of a network (wired or wireless) or a bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A method for determining weather data along a trajectory of an aircraft, comprising:
   (a) storing weather data from a multiplicity of weather data sources, wherein the stored weather data comprises forecasted weather data and in-situ weather data;
   (b) receiving flight data;
   (c) translating the flight data into a time and a geospatial point or volume;
   (d) selecting forecasted weather data and in-situ weather data from the stored weather data, the selected forecasted and in-situ weather data being associated with said geospatial point or volume and respective times;
   (e) determining whether to wait for the next forecasted weather data or not;
   (f) in response to a determination not to wait for the next forecasted weather data, determining whether either of the selected forecasted weather data and selected in-situ weather data meets requirements of a subscriber or not;
   (g) in response to a determination that one of the selected forecasted weather data and selected in-situ weather data meets the requirements of the subscriber, formulating a weather message containing the one of the selected forecasted weather data and selected in-situ weather data; and
   (h) sending the weather message to or making the weather message available to the subscriber or approved recipients.

2. The method as recited in claim 1, wherein the selected forecasted and in-situ weather data comprises weather quality, accuracy or confidence attribute values and step (f) comprises determining whether the selected forecasted and in-situ weather data and weather quality, accuracy or confidence attribute values of the selected forecasted and in-situ weather data meet the requirements of the subscriber or not.

3. The method as recited in claim 1, further comprising determining whether the selected weather data should be reassessed or not.

4. The method as recited in claim 3, further comprising determining whether one or more weather data sources should be interrogated or not.

5. The method as recited in claim 3, further comprising determining reassessed weather quality, accuracy or confidence attribute values.

6. The method as recited in claim 1, further comprising determining whether additional or updated weather data is needed in order to meet the requirements of the subscriber or not.

7. The method as recited in claim 6, further comprising:
   identifying which weather data source or sources should be interrogated in order to obtain additional or updated weather data; and
   determining when each identified weather data source should be interrogated.

8. The method as recited in claim 6, further comprising:
   formulating an interrogation message or messages containing a request for additional or updated weather data; and
   sending the interrogation message or messages to one or more weather data sources.

9. The method as recited in claim 8, further comprising:
   receiving additional or updated weather data from a weather data source or sources;
   assessing weather quality, accuracy or confidence attribute values of the additional or updated weather data;
   storing the additional or updated weather data; and
   selecting weather data from the stored additional or updated weather data, the selected weather data from the stored additional or updated weather data being associated with said geospatial point or volume taking into account the weather quality, accuracy or confidence attribute values of the additional or updated weather data.

10. The method as recited in claim 1, wherein step (e) comprises determining whether the next forecasted weather data is scheduled to arrive within a specified threshold of time, further comprising:
    (i) in response to a determination that the next forecasted weather data is scheduled to arrive within the specified threshold of time, waiting for the next forecasted weather data and selecting data of the next forecasted weather data associated with said geospatial point or volume;
    (j) determining whether the selected next forecasted weather data meets requirements of the subscriber or not;
    (k) in response to a determination that the selected next forecasted weather data meets the requirements of the subscriber, formulating a weather message containing the selected next forecasted weather data; and
    (l) sending the weather message to or making the weather message available to the subscriber or approved recipients.

11. The method as recited in claim 1, wherein step (f) comprises determining a relationship between an issuance time of the selected forecasted weather data and a time of the selected in-situ weather data.

12. A system for determining weather data along a trajectory of an aircraft, comprising a communications manager and a computer system configured to:

store weather data from a multiplicity of weather data sources, wherein the stored weather data comprises forecasted weather data and in-situ weather data;

receive flight data;

translate the flight data into a time and a geospatial point or volume;

retrieve forecasted weather data and in-situ weather data from the stored weather data, the retrieved forecasted and in-situ weather data being associated with said geospatial point or volume and respective times;

determine whether to wait for the next forecasted weather data or not;

in response to a determination not to wait for the next forecasted weather data, determine whether either of the retrieved forecasted weather data and retrieved in-situ weather data meets requirements of a subscriber or not; and in response to a determination that one of the retrieved forecasted weather data and retrieved in-situ weather data meets the requirements of the subscriber, formulate a weather message containing the one of the selected forecasted weather data and selected in-situ weather data; and wherein said communications manager is configured to send the weather message to or make the weather message available to the subscriber or approved recipients.

13. The system as recited in claim 12, wherein the retrieved forecasted and in-situ weather data comprise weather quality, accuracy or confidence attribute values and said meeting of requirements determination operation comprises determining whether the weather quality, accuracy or confidence attribute values of the retrieved forecasted and in-situ weather data fall within a subscriber-defined range of acceptable values or not.

14. The system as recited in claim 12, wherein said computer system is further configured to determine whether the retrieved weather data should be reassessed or not.

15. The system as recited in claim 12, wherein said computer system is further configured to determine whether additional or updated weather data is needed in order meet the subscriber's requirements or not.

16. The system as recited in claim 15, wherein said computer system is further configured to:
identify which weather data source or sources should be interrogated in order to obtain additional or updated weather data; and
determine when each identified weather data source should be interrogated.

17. The system as recited in claim 12, wherein said computer system is further configured to:
receive additional or updated weather data from a weather data source;
determine a weather quality, accuracy or confidence attribute value of the additional or updated weather data;
store the additional or updated weather data; and
select weather data from the stored additional or updated weather data, the selected weather data being associated with said geospatial point or volume taking into account the weather quality, accuracy or confidence attribute values of the additional or updated weather data.

18. The system as recited in claim 12, wherein said determining whether to wait for the next forecasted weather data or not comprises determining whether the next forecasted weather data is scheduled to arrive within a specified threshold of time, wherein said computer system is further configured to:
in response to a determination that the next forecasted weather data is scheduled to arrive within the specified threshold of time, wait for the next forecasted weather data and select data of the next forecasted weather data associated with said geospatial point or volume;
determine whether the selected next forecasted weather data meets requirements of the subscriber or not; and
in response to a determination that the selected next forecasted weather data meets the requirements of the subscriber, formulate a weather message containing the selected next forecasted weather data; and
wherein said communications manager is configured to send the weather message to or make the weather message available to the subscriber or approved recipients.

19. A method for determining weather data along a trajectory of an aircraft, comprising:
(a) storing weather data from a multiplicity of weather data sources, wherein the stored weather data comprises forecasted weather data and in-situ weather data;
(b) receiving flight data;
(c) translating the flight data into a time and a geospatial point or volume;
(d) selecting forecasted weather data and in-situ weather data from the stored weather data, the selected forecasted and in-situ weather data being associated with said geospatial point or volume and respective times;
(e) determining that the selected forecasted weather data comprises weather accuracy and confidence attribute values that do not both meet requirements of a subscriber;
(f) determining that the selected in-situ weather data comprises weather accuracy and confidence attribute values that do not both meet the requirements of the subscriber;
(g) assimilating the selected forecasted and in-situ weather data;
(h) deriving weather accuracy and confidence attribute values for the assimilated weather data;
(i) determining that the weather accuracy and confidence attribute values for the assimilated weather data both meet the requirements of the subscriber;
(j) in response to a determination that the weather accuracy and confidence attribute values for the assimilated weather data both meet the requirements of the subscriber, formulating a weather message containing the assimilated weather data; and
(k) sending the weather message to or making the weather message available to the subscriber or approved recipients.

20. The method as recited in claim 19, wherein:
step (e) comprises determining that the selected forecasted weather data comprises a weather accuracy attribute value that does not meet the requirements of the subscriber and a weather confidence attribute value that does meet the requirements of the subscriber; and
step (f) comprises determining that the selected in-situ weather data comprises a weather accuracy attribute value that meets the requirements of the subscriber and a weather confidence attribute value that does not meet the requirements of the subscriber.

* * * * *